US006302989B1

(12) United States Patent
Kaule

(10) Patent No.: US 6,302,989 B1
(45) Date of Patent: Oct. 16, 2001

(54) METHOD FOR PRODUCING A LAMINAR COMPOUND FOR TRANSFERRING OPTICALLY VARIABLE SINGLE ELEMENTS TO OBJECTS TO BE PROTECTED

(75) Inventor: Wittich Kaule, Emmering (DE)

(73) Assignee: Giesecke & Devrient GmbH, Munich (DE)

(*) Notice: Subject to any disclaimer, the term of this patent is extended or adjusted under 35 U.S.C. 154(b) by 0 days.

(21) Appl. No.: 09/200,748

(22) Filed: Nov. 30, 1998

Related U.S. Application Data

(63) Continuation-in-part of application No. 08/409,220, filed on Mar. 23, 1995, now abandoned.

(30) Foreign Application Priority Data

Mar. 31, 1994 (DE) ........................................ 44 11 404

(51) Int. Cl.[7] ........................................ B32B 31/00

(52) U.S. Cl. .......................... 156/240; 156/230; 156/239; 156/289; 427/146; 427/152

(58) Field of Search .............................. 156/230, 231, 156/233, 239, 240, 241, 289; 427/146, 147, 152

(56) References Cited

U.S. PATENT DOCUMENTS 4,728,377 * 3/1988 Gallagher .
4,758,296 7/1988 McGrew .............................. 156/231
4,933,120 * 6/1990 D'Amato et al. .
5,142,383 * 8/1992 Mallik .
5,248,544 * 9/1993 Kaule .
5,383,687 * 1/1995 Suess et al. .
5,618,378 * 4/1997 Cahill .
5,801,857 * 9/1998 Heckenkamp et al. .
5,807,456 * 9/1998 Kaule .................................. 156/230
5,817,205 * 10/1998 Kaule .................................. 156/233
5,820,971 * 10/1998 Kaule et al. ..................... 156/233 X
6,036,232 * 3/2000 Kaule et al. .

FOREIGN PATENT DOCUMENTS 0 440 045 * 1/1991 (EP) .

* cited by examiner

*Primary Examiner*—Curtis Mayes
(74) *Attorney, Agent, or Firm*—Reed Smith Hazel & Thomas LLP

(57) ABSTRACT

The invention relates to a method for producing a lammar compound for transferring optically variable elements to objects to be protected, the laminar compound comprising a carrier substrate and isolated single elements on said carrier substrate in the contour shape of the elements to be transferred. The method comprises the steps of: providing a carrier substrate; applying at least one embossable layer on said carrier substrate with the contour shape of said element to be transferred; forming a diffraction structure in said embossable layer in the form of a relief; and forming a reflecting layer on said diffraction structure.

13 Claims, 4 Drawing Sheets

METHOD FOR PRODUCING A LAMINAR COMPOUND FOR TRANSFERRING OPTICALLY VARIABLE SINGLE ELEMENTS TO OBJECTS TO BE PROTECTED

This application is a continuation-in-part of application Ser. No. 08/409,220, filed Mar. 23, 1995, now abandoned.

FIELD OF THE INVENTION

This invention relates to a laminar compound for transferring optically variable elements from a transfer sheet to objects to be protected, particularly security documents such as bank notes or identity cards, the transfer sheet comprising a carrier substrate having a layer in which diffraction structures are incorporated in the form of a relief and which is combined with a reflecting layer.

BACKGROUND OF THE INVENTION

Optically variable elements, such as holograms or interference layer elements, are gaining increasing importance in many areas for various reasons. As a rule these elements show different colors dependent on the viewing angle. However they can also contain different information which is recognizable solely at certain viewing angles. In the area of protection of a great variety of objects against forgery, falsification or other kinds of manipulation, holograms and similar diffraction structures have been applied in many ways, since the angledependent effects can be imitated only with disproportionately high effort. On the other hand, optically variable elements permit a fast visual check and offer good copy protection since the angle-dependent effects cannot be reproduced by a copying machine.

For the protection of security documents such as identity cards or bank notes, reflection holograms are frequently used. They are usually produced by means of special matrices which have a surface relief corresponding to the diffraction pattern of the hologram by embossing the surface relief in a layer of lacquer, subsequently metalizing it and a layer. The metalizing ensures the brilliance of the hologram so that it is visually well recognizable.

Various possibilities have been proposed for applying such holograms to security documents in a locally limited form. One of the most proven techniques is to prepare a separate, continuous transfer band from which the hologram is transferred to the document well-placed in the desired contour (DE-A1 33 08,831). The layers to be transferred are applied all over to a carrier substrate provided with an easily detachable separation layer in the reverse order to the one in which they are to exist later on the document. The uppermost layer is an adhesive layer, for example a hot-sealing adhesive layer. Via this adhesive layer the hot stamping band and the document are interconnected under the influence of heat and pressure (hot stamping). The carrier substrate of the transfer band can subsequently be removed effortlessly because of the separation layer. The definition of the surface areas to be transferred can take place either via the adhesive layer, which is printed in a certain pattern so that the layer structure to be transferred adheres to the document only in some places, or via the pressure stamp used during lamination, which in this case has a contour shape corresponding to the shape to be transferred, so that even if hot-sealing adhesive is applied over a large surface only those areas of the adhesive layer are activated on which the punch exerts pressure and heat (DE-A1 33 08 831). During the following removal of the transfer band the hologram layer structure comes off the transfer band in the area of the activated adhesive layer and adheres to the document. This presupposes, however, that the hologram layer structure is of very thin and relatively unstable design to guarantee a clean separation of the element from the continuous coating of the transfer band. This requirement conflicts with the general striving to make holograms as durable and resistant as possible.

To also do justice to the demand that the hologram be resistant to mechanical or other influences, it was proposed in the past to provide in the layer structure of the transfer band a thin resistant film layer which serves as a protective layer for the hologram after transfer to the final substrate (EP-A2 466 118). This guarantees sufficient protection of the hologram against mechanical and other loads, but the transfer of this layer structure to a receiving substrate requires additional method steps since the stable protective layer does not tear in the edge area of the activated adhesive layer upon removal of the transfer band and thus prevents extraction of the element. It is thus necessary to prestamp the contour of the desired surface element in the protective film before applying the hologram, so that it is possible to extract the hologram from the surrounding material during transfer.

An alternative possibility of transferring relatively durable hologram labels to documents by a modified transfer method is described in DE-A1 41 30 896. Here the carrier substrate first receives a cold adhesive layer over which the usual hologram layer structure is finally disposed in the order in which it is to exist on the document later, followed by a stable protective layer. To produce defined single elements, the layer structure is stamped without damaging the carrier substrate. The superfluous part of the laminar compound (grid) is removed from the carrier substrate so that only the spaced apart single labels are present on the carrier substrate. During transfer, the carrier substrate is removed and the label fastened to the document by means of the cold adhesive layer. Since the adhesive layer is covered by the carrier substrate, automated transfer of these labels is complicated and requires additional apparatus components which furter increase the already high production costs of hologram elements.

The invention is thus based on the problem of producing a laminar compound from durable and tear-resistant layers which contains diffraction structures and permits well-placed single elements to be applied to objects to be protected by the transfer method in a simple and cost-effective way.

The solution to this problem can be found in the independent claims. Developments are stated in the subclaims.

SUMMARY OF THE INVENTION

The invention is based on the fundamental idea of already considering the contour shapes of the single element to be transferred during production of the element layer structure on a carrier substrate, i.e. the single elements are produced directly on the carrier substrate of the lainaier compound. They have the sequence of layers typical of transfer elements, in which the adhesive layer forms the outermost layer, unless it is applied to the document beforehand. However, this sequence of layers is disposed on the carrier substrate in spaced apart areas.

The inventive solution has the advantage that virtually any materials can be selected for the layer structure of the single elements, solely according to their expediency for the element to be produced. Furthermore, when transferring the elements one requires no additional apparatus or measures which make the transfer of these elements more elaborate and thus ultimately raise the price of the final product. Since the later geometric extension of the element on the object to be protected is already considered during production of the element layer structure on a carrier substrate, there is no need for the layer structure to tear at the edges of a hot stamping die, as is used in the conventional hot stamping method. One can thus of course also dispense with the use of a specially formed hot stamping die. If hot-melt adhesives are used it thus suffices to ensure a sufficient supply of heat which activates the adhesive.

The apparatus necessary in the prior art for prestamping any tear-resistant layers present in the element layer structure are likewise no longer required for transferring the inventive elements. A further advantage is to be seen in the fact that practically no surplus layer material is produced. With conventional hot stamping films, which are provided all over with the layer structure to be transferred, the elements are stamped out according to the desired contour shape via the hot stamping die so that the surplus always remains on the carrier substrate. According to the invention, however, only so much layer material is applied to the carrier substrate as is subsequently required for transfer. After the elements are transferred to the document material the carrier substrate is practically free from any element layer material and can possibly be reused for the production of single elements.

According to a preferred embodiment, the laminar compounds comprises a carrier substrate to which a reaction lacquer is applied in the form of the later element in spaced apart areas. This layer of lacquer contains the diffraction structures in the form of an embossed relief structure which is provided with a thin reflecting layer, preferably a metal layer. The well-placed application of the metalizing preferably takes place via masking by means of chemically soluble inks. The carrier substrate provided with the embossed lacquer areas is printed with a soluble ink in the later metal-free areas and subsequently metalized all over e.g. in a vacuum evaporation unit. In a solution bath the ink is washed off along with the parts of the metal layer directly thereabove. The metalized embossing remains on the carrier substrate. During application to an object to be protected, e.g. a security document or product packaging, the object is preferably provided with an adhesive layer whose extension is larger than the element to be placed, with consideration of tolerances.

To guarantee easy detachment of the element layer structure from the carrier substrate, it can be provided with a separation layer. This is preferably a cold-detaching reaction lacquer as is known from P 44 04 128.4.

The carrier substrate can be in form of a film or a band.

BRIEF DESCRIPTION OF THE DRAWINGS

Further embodiments of the invention as well as its advantages will be explained with reference to the figures. For more clarity, the individual layers of the layer structures shown in the figures are shown with exaggerated thickness and not true to scale.

DETAILED DESCRIPTION OF THE INVENTION

Figure 1:
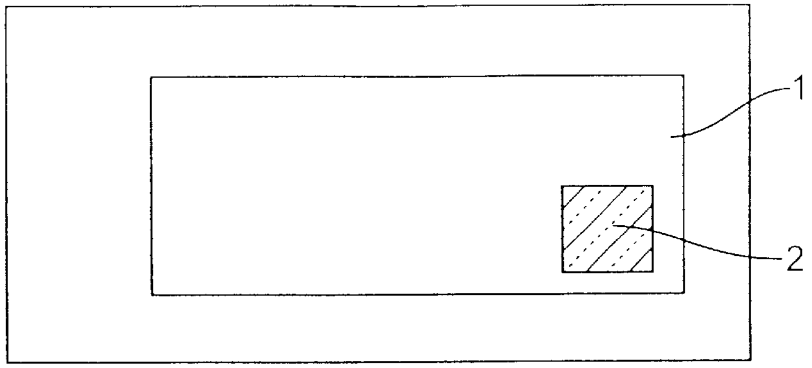
FIG. 1 shows a security document with a well-placed single hologram

FIG. 1 shows bank note 1 with optically variable element 2 according to the present invention. Optically variable element 2 is preferably a reflection hologram, which was transferred to document 1 as a well-placed single element by the transfer method.

Figure 2:
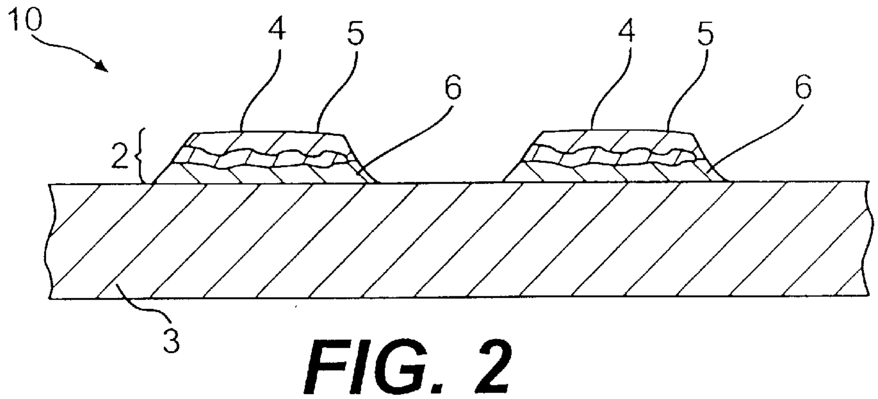
FIG. 2 shows a laminar compound according to the invention

FIG. 2 show inventive laminar compound 10 which comprises a carrier substrate 3 on which holographic single elements 2 are disposed in spaced apart areas. Elements 2 shown here are composed of embossed lacquer layer 6, metal layer 5 covering the embossing as well as firter lacquer layer 4 which serves as a protective layer. The protective layer preferably likewise comprises a layer of reaction lacquer.

Since elements 2 are produced on the carrier substrate as isolated single elements, the layer structure can also be composed of any other layer materials. For example, stable thermoplastic layers as are described e.g. in EP A2 0 466 118 can be used instead of lacquer layer 6. It is likewise possible for example to use instead of metal layer 5 a di-electric layer with an accordingly adapted refractive index. As carrier substrate 3, one can use any material which fulfills the desired demands for tear resistance and adhesive characteristics, but preferably a plastic film is used.

With reference to FIG. 3 the production method as well as the transfer of single element 2 to an object to be protected will be described in the following. In a first step carrier substrate 3 is printed at preferably regular intervals with lacquer layer 6 in the size and shape of the hologram to be placed. As shown schematically in FIG. 3*a*, this can be done in halftone photogravure printing unit 15, but any other coating and/or printing method (e.g. screen printing) is also conceivable.

Printed lacquer layer 6 can be a layer of reaction lacquer, e.g. a UV or blue light hardenable or UV initiatable lacquer, as are described in German patent application P 4404128.4, the subject matter of which is herein incorporated by reference.

Figure 3A:
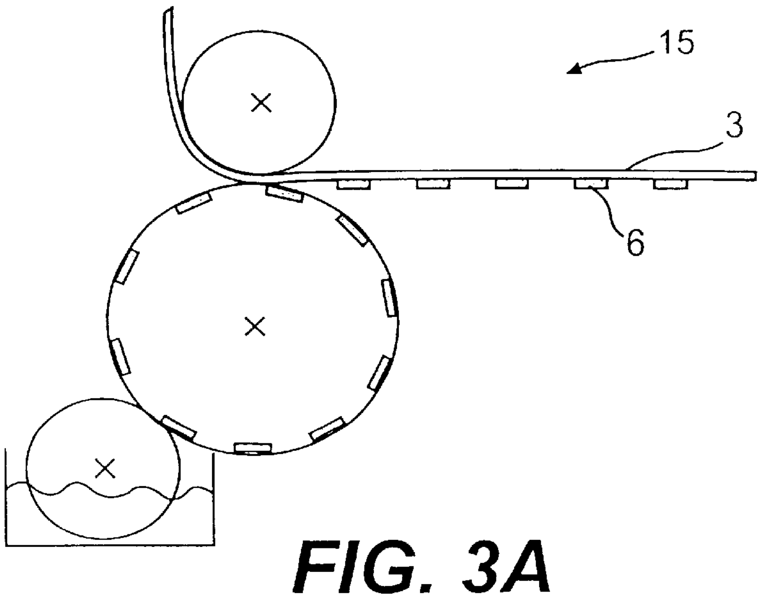
FIGS. 3*a* to 3*f* show the production of the inventive laminar compound and the transfer of a single element to an object to be protected
Figure 3B:
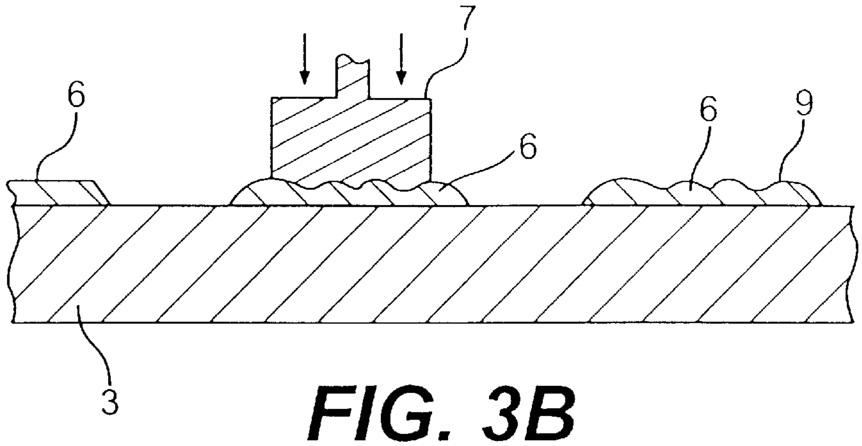

Subsequently this printed carrier substrate 3 is provided in the area of lacquer coating 6 with diffraction structure 9 by bringing die 7 bearing relief structure 9 to be transferred in contact with lacquer layer 6 and simultaneously hardening lacquer layer 6 (FIG. 3*b*).

Figure 3C:
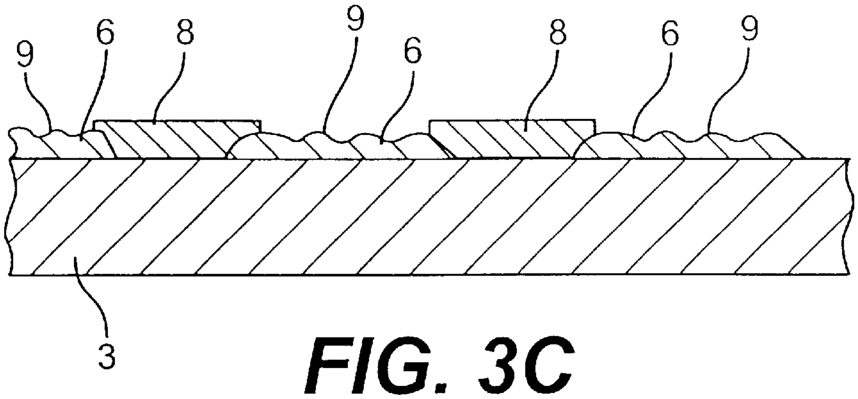
Figure 3D:
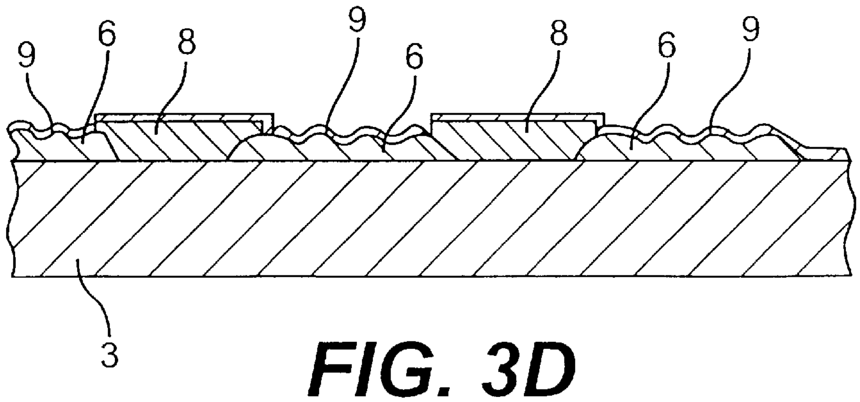
Figure 3E:
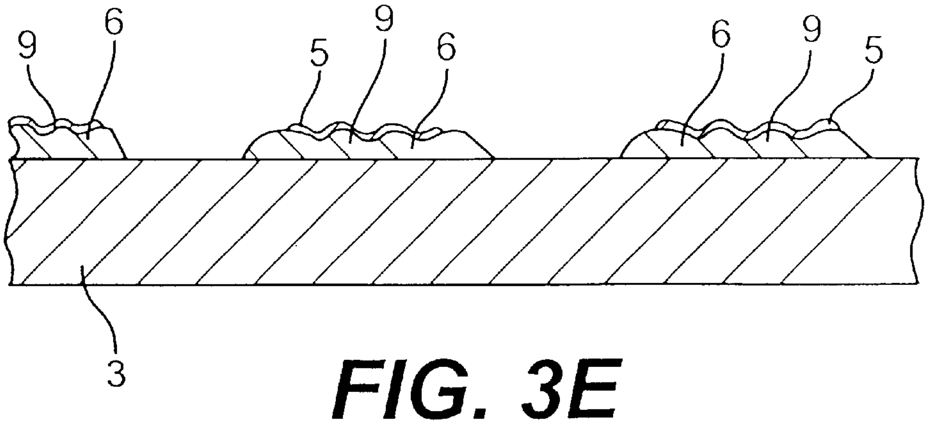

According to FIG. 3*c* the carrier substrate is printed in the next process step with chemically soluble ink 8 in the areas which are to bear no metalizing in the finished laminar compound. Since the surface extent of lacquer layer area 6 is larger than actual embossed area 9 to permit compensation of tolerances in register, the edge areas of lacquer layer 6 are also printed with soluble ink 8 so that essentially only embossed structure 9 remains unprinted. Carrier substrate 3 prepared in this way subsequently receives all-over metalizing 5 that covers both ink areas 8 and embossed structure 9 (FIG. 3*d*). The metalizing can be done by one of the standard methods, e.g. vacuum evaporation. In the following step soluble ink 8 and the part of metal layer 5 located thereabove are removed in a suitable solution bath. As shown in FIG. 3*e*, only embossed lacquer areas 6 and metal layer 5 covering embossing 9 remain on carrier substrate 3. Instead of masking by a chemically soluble ink as described above, one can of course also use any other masking method to metalize the embossing.

Figure 3F:
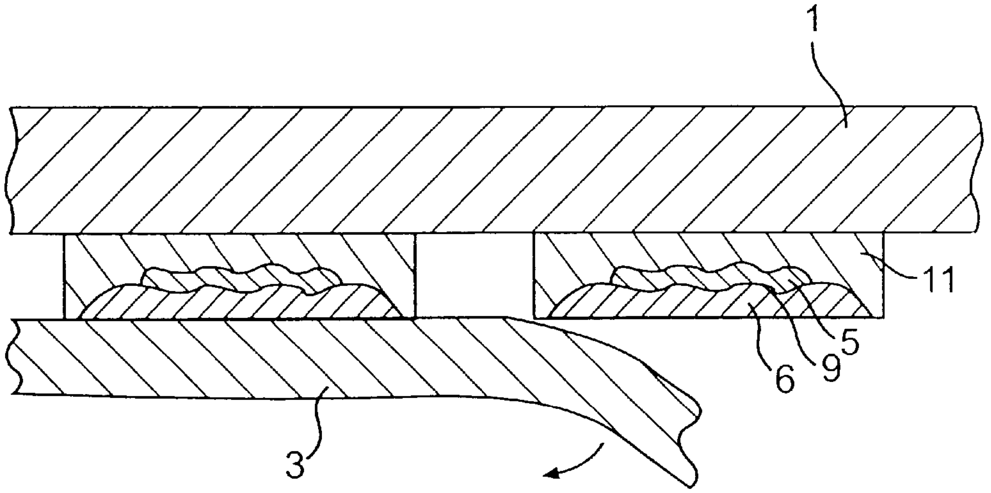

The metalizing can now be optionally covered with protective layer 4, as shown in FIG. 2. For transferring element 2 to an object to be protected, either the receiving object or element area 2 of carrier substrate 3 is provided with adhesive layer 11, preferably a reaction adhesive, whereby adhesive 11, in view of possible tolerance problems, occupies a larger surface than element 2 actually to be transferred. Finally, laminar compound 10 is brought in contact with the predetermined place in the receiving bank note substrate in the area of element 2, and adhesive 11 hardened. In a last step carrier substrate 3 is removed (FIG. 3*f*).

The well-placed hologram now comprises an embossed, metalized inner area and a transparent, narrow edge area in which lacquer layer and adhesive layer overlap and which not only absorbs the manufacturing tolerances but also seals the metal layer, thereby protecting it from harmfull environmental influences.

To facilitate detachment of the elements from the carrier substrate, it can be printed with a waxy separation layer, e.g. an easily detached layer of reaction lacquer, before being coated with the island-like lacquer areas.

Since antifalsification papers have a relatively rough surface to be able to take up steel intaglio ink, and this roughness might possibly disturb the visual impression of the diffraction structures, it is frequently advantageous to smooth the area of the paper intended for receiving the security element before transfer. This can be done by compressing the paper and/or by applying a smoothing primer layer.

In a variant of the above-described embodiment, additional optical effects can be produced by partly printing the embossed area or not printing the edge area of lacquer layer 6 with ink 8 (see FIG. 3*c*). By additionally printing the embossed area in the form of characters, patterns or the like, one can thus produce a further metal-free area within hologram embossing 9 which represents e.g. readable information.

The application of the described method is of course not limited to transferring holograms to bank notes. Interference layer elements or other layer structures with optical effects dependent on the viewing angle can also be produced well-placed on the carrier substrate and transferred to any objects to be protected, such as product packaging, the products themselves or identity cards, analogously to the method described above for holograms.

Figure 4:
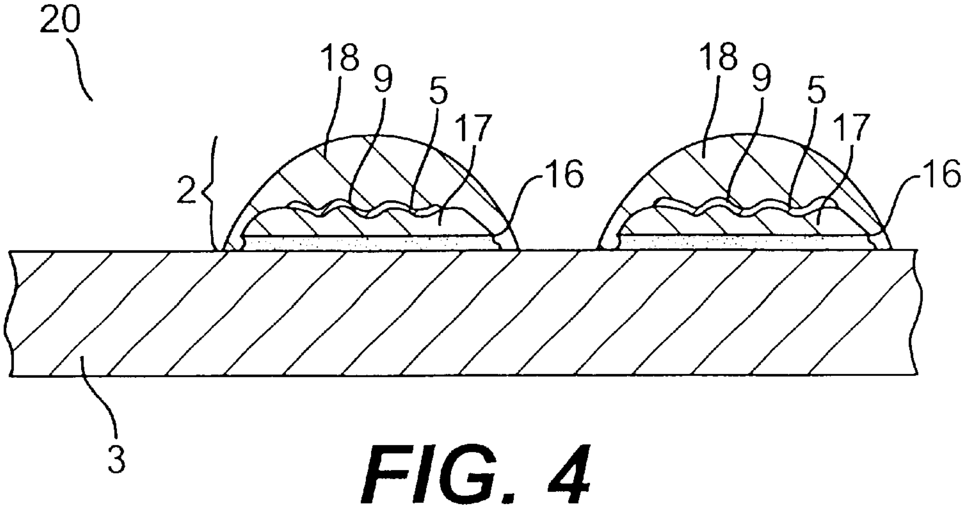
FIG. 4 shows a further embodiment of the inventive laminar compound

However, the inventive method can also be used advantageously for conventional thermoplastic hologram layers, since they need no longer be tearable but can be as stable as possible. In this case carrier substrate 3 is printed in a first step with e.g. waxy separation layer 16 all over or likewise in well-placed fashion. The carrier substrate is then printed with thermoplastic lacquer 17, as shown in FIG. 3*a*. The following production steps proceed analogously to those shown in FIGS. 3*b* to 3*e*. In a last step adhesive layer 18 is applied to the element layer structure, whereby this layer should also be of somewhat larger dimensions than embossed lacquer layer 17 to compensate tolerances and to seal the metal layer. FIG. 4 shows the layer structure of laminar compound 20. Adhesive layer 18 can be either one of the abovementioned reaction lacquers or a hot-melt adhesive.

Figure 5:
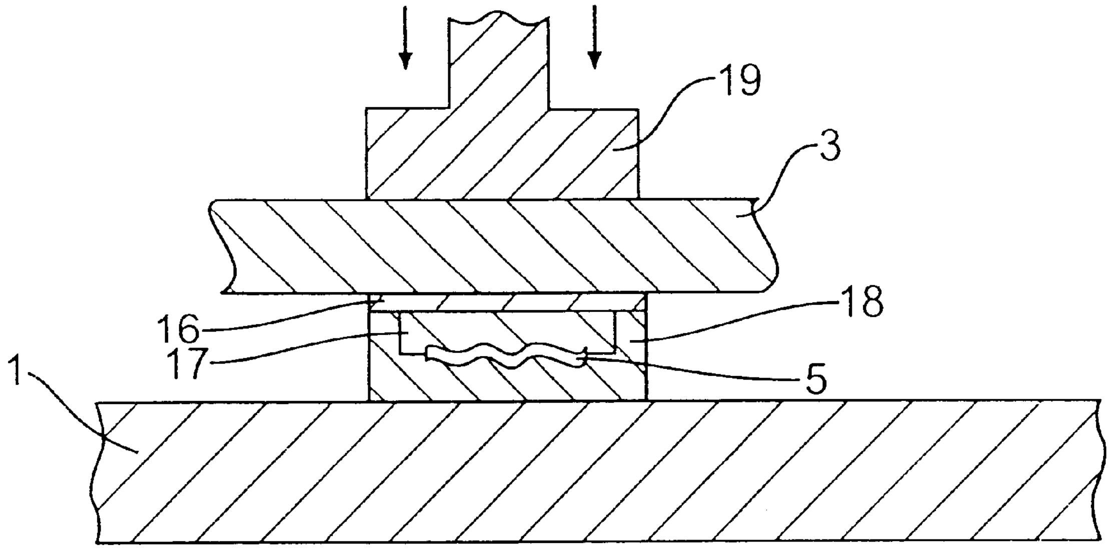
FIG. 5 shows the transfer of a single element to an object to be protected

Thus prepared single elements 2 are transferred with the help of heated die 19, which activates hot-melt adhesive 18 and fixes element layer structure 2 to substrate 1 (FIG. 5). Finally, carrier substrate 3 is removed in a last step.

The principles, preferred embodiments and modes of operation of the present invention have been described in the foregoing description. The invention which is intended to be protected herein should not, however, be construed as limited to the particular forms disclosed, as these are to be regarded as illustrative rather than restrictive. Variations and changes may be made by those skilled in the art without departing from the spirit of the present invention. Accordingly, the foregoing detailed description should be considered exemplary in nature and not limited to the scope and spirit of the invention as set forth in the appended claims.

What is claimed is:

1. A method for producing a laminar compound for transferring optically variable elements to objects to be protected, the laminar compound comprising a carrier substrate and isolated single elements on said carrier substrate in the contour shape of the elements to be transferred, the method comprising the steps of:

providing a carrier substrate;

producing at least one embossable layer on that carrier substrate in the contour shape of said element to be transferred;

forming a diffraction structure in said embossable layer in the form of embossed reliefs after said embossable layer is produced on that carrier substrate; and forming a reflecting layer on each of the embossed reliefs thereby forming the isolated single elements, whereby the reflecting layer is formed on the embossed reliefs so that each of the isolated single elements has an embossed, reflecting inner area and an edge area, surrounding the embossed, reflecting inner area where the embossed relief and the reflecting layer are not present.

2. The method of claim 1, wherein the carrier substrate is a plastic film and wherein the forming a reflecting layer step comprises metalizing the diffraction structure.

3. The method of claim 2, wherein the diffraction structure is metalized by a masking method using chemically soluble inks.

4. The method of claim 3, wherein the masking method comprises the steps of:

printing the areas of the plastic film not to be metalized with a chemically soluble ink;

metalizing the entire surface of the plastic film; and detaching the soluble ink and the metalizing located thereon so that the metalizing remains solely in the ink-free areas of the plastic film.

5. The method of claim 4, wherein the plastic film surface is metalized by vacuum evaporation.

6. The method of claim 3, wherein the embossable layer is a transparent layer such that each of the elements with the diffraction structure has an embossed, metalized inner area and a transparent edge area.

7. The method of claim 2, wherein the plastic film is printed at least partially with a waxy separation layer.

8. The method of claim 2, wherein gaps are produced in the metalizing of the diffraction structure in the form of characters or patterns.

9.The method of claim 1, wherein a reaction lacquer or thermoplastic lacquer is printed on the carrier substrate as an embossable layer.

10. The method of claim 1, wherein the carrier sustrate is in the form of a film or a band.

11. The method of claim 1, wherein the producing step includes at least one of coating and printing said embossable layer.

12. A method for producing a document having an optically variable element thereon, the method comprising the steps of:

providing a receiving document;

providing a carrier substrate;

producing at least one embossable layer on that carrier substrate in the contour shape of said element to be transferred;

forming a diffraction structure in said layer in the form of an embossed relief after said embossable layer is produced on that carrier substrate;

forming a reflecting layer on the embossed relief thereby forming the optically variable element, whereby the reflecting layer is formed on the embossed relief so that the optically variable element has an embossed, reflecting inner area and an edge area, surrounding the embossed, reflecting inner area, where the embossed relief and the reflecting layer are not present; and transferring the optically variable element comprising the embossable layer, said embossed relief, and said reflecting layer from the carrier substrate to the receiving document.

13. The method of claim 12, wherein the producing step includes at least one of coating and printing said embossable layer.

* * * * *